(12) United States Patent
Ives

(10) Patent No.: X2154
(45) Date of Patent: Jun. 18, 1814

(54) BUTTONS,HOLDFAST WHILE POLISHING

(76) Inventor: Ira Ives

The schedule referred to in these Letters Patent and making
part of the same, containing a description in the words of the said Ira
Ives himself of his Button Holdfast.

The hook and spring are attached to the chuck, which screws
into the Mandrel, having a suitable orifice in the end to receive the eye of
a button.

A mortice is made thro' the chuck about one inch in length
& one eighth of inch wide, having the lip of the orifice in line. Into this mor-
tise a piece of iron called the hook is fitted & fastened by a pin or pivot on
which it plays about three fourths of an inch from the end of the chuck
where the eye of the button is inserted and having a hook on the end
which goes into the mortise fitted to enter the eye of the button, and on the
other end a haft about three inches in length rising from the pivot
in an angle of about twenty degrees. Under the haft at the end of it
is rivetted a spring resting back on the chuck, & tending to keep the
hook down in its place. The end of the hook which enters the eye should
be tapered nearly to a point, swelling towards the shoulder on the side
furthest from the button in the form of a wedge.

The haft of the hook being pressed down by the hand, the hook will be
drawn out of the way, and the eye of the button, being inserted into the orifice
of the chuck & the haft let go the spring forces the point of the hook into the eye
and being of a wedging form has a constant tendency by the force of the spring
to draw the button close, & hold it firm to the face of the chuck during the operation
of turning. When finished the button is released by simply pressing down
the haft & the machine is instantly ready to receive another.

The objects aimed at in this invention are expedition & a more per-
fect security of the button. Both are attained. Nothing of the kind
yet discovered is so expeditious, and nothing hitherto has been found
so effectually to secure a button from shaking &c as the wedging hook &
spring, which holds all that is gained by pressure in the operation of
finishing a button.

Witnesses Ira Ives

Simeon Baldwin } Rec'd & [illegible] this 15th day of April 18[illegible].

Eber Clark } S.S. [illegible]

2—328 *a.*

DRAFTSMAN'S DIVISION.

*All communications should be addressed to*
"The Commissioner of Patents,
Washington, D. C."

*DEPARTMENT OF THE INTERIOR,*

United States Patent Office.

*Washington, D. C.,* ............................................, *189*__

*SIR:*

*The printed* ....copies.................... *of Patent No.* J. Ives. ........
June 14, 1814

......are........ *exhausted.*

*As soon as reprinted a copy will be mailed you to complete your order.*

*By direction of the Commissioner:*

*Very respectfully,*

........................................................

*Chief Clerk.*

3143b6-97-5m